2 Sheets—Sheet 1.
D. L. EMERSON.
Combined Reel and Rake for Harvesters.
No. 219,453. Patented Sept. 9, 1879.
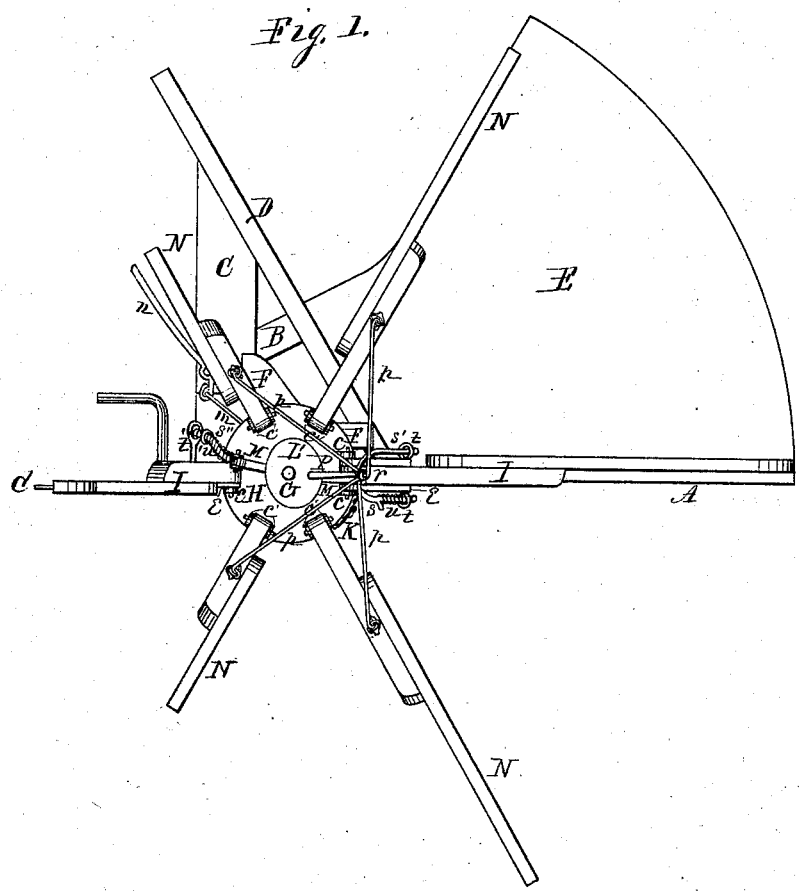
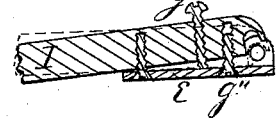
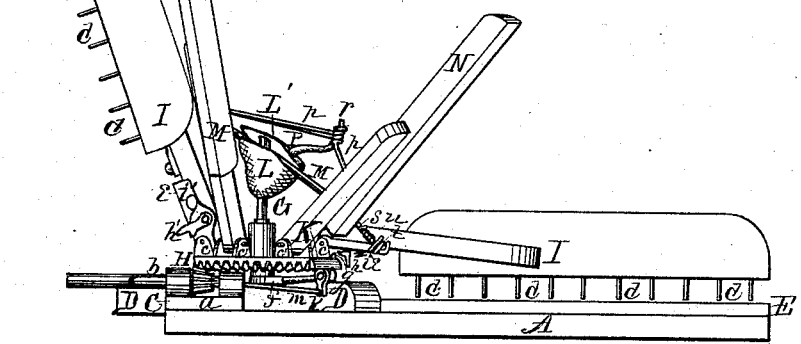
Witnesses.
Inventor.
Daniel L. Emerson.
Per Jacob Behel,
Atty.

2 Sheets—Sheet 2.
D. L. EMERSON.
Combined Reel and Rake for Harvesters.
No. 219,453. Patented Sept. 9, 1879.
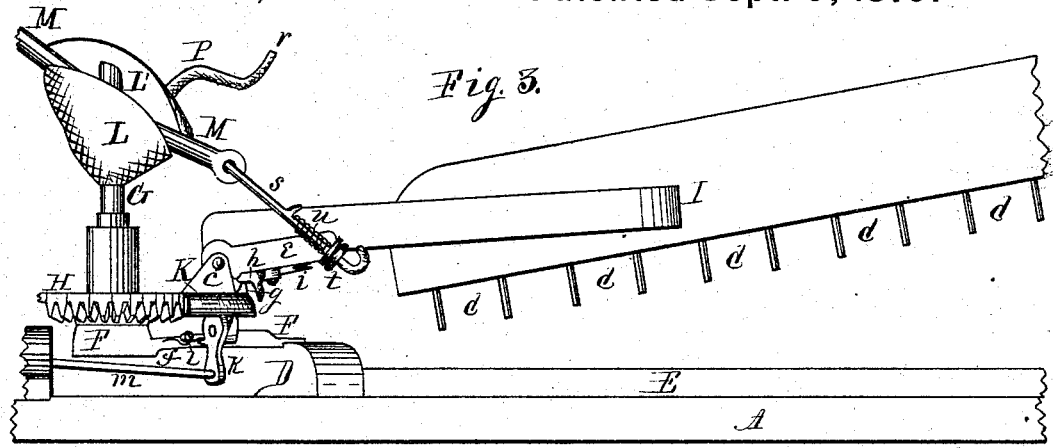
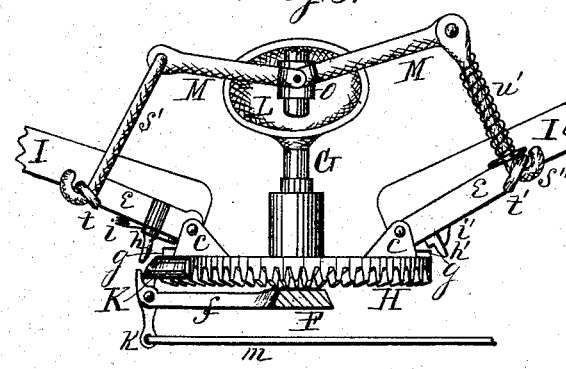
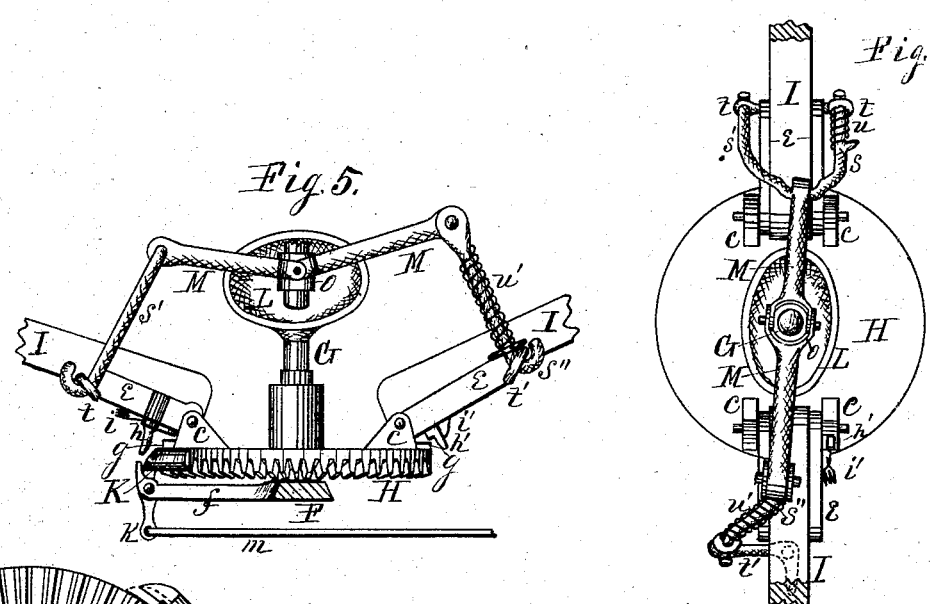
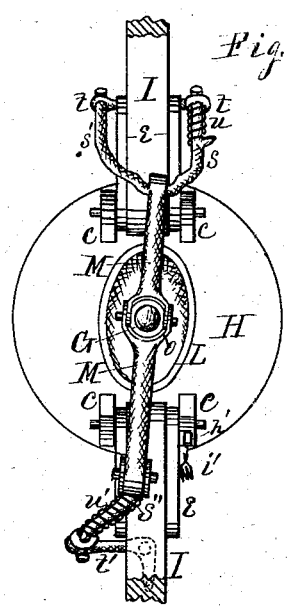
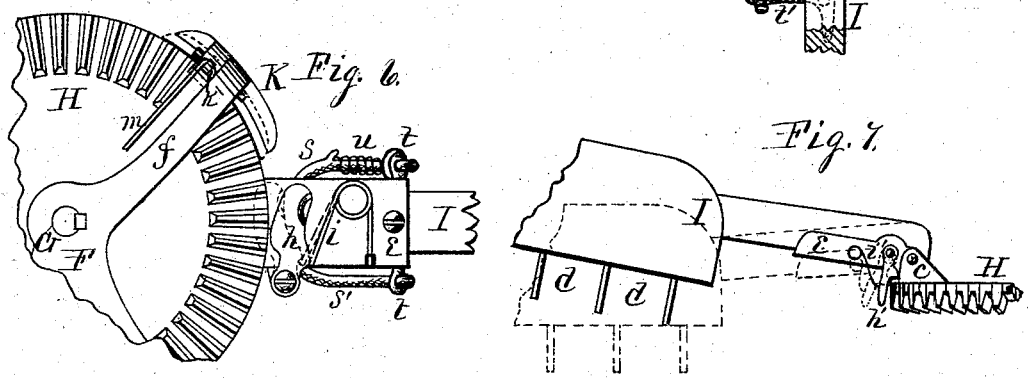
Witnesses.
Inventor.
Daniel L. Emerson
Per Jacob Behel
Atty.

UNITED STATES PATENT OFFICE.

DANIEL L. EMERSON, OF ROCKFORD, ILLINOIS.

IMPROVEMENT IN COMBINED REEL AND RAKE FOR HARVESTERS.

Specification forming part of Letters Patent No. 219,453, dated September 9, 1879; application filed April 19, 1879.

*To all whom it may concern:*

Be it known that I, DANIEL L. EMERSON, of the city of Rockford, in the county of Winnebago and State of Illinois, have invented a new and useful Improvement in Reaping-Machines, of which the following is a specification.

This invention relates to that class of reaping-machines known as "self-raking" reapers, in which the rake and reel are combined, operating to gather the grain to the cutters, deposit it on the platform as it is cut, and sweep the cut grain from the platform, to deposit it in gavels.

In a combined rake and reel of this class, in which the rake-heads are designed to operate either as a rake or as a reel-bat, it has been customary to construct them in such a manner as to give practically a positive unyielding motion to the rake-heads in their independent lines of travel when operating either as a reel or as a rake. This has usually been accomplished by the employment of a cam or cams, constructed with trackways provided with a switch or switches, operating to control the movement of the rake. This practically unyielding movement of the rake has been a fruitful source of breakages of the parts in this class of rakes.

The object of this invention is to produce a combined rake and reel in which the rake-heads will be capable of use either as a rake or as a reel-bat, and in either capacity will be made to traverse the platform in their respective pathways in a plane substantially parallel thereto, differing only in height, and in either capacity the rake-head will be limited in its descent to the plane of its pathway, but will be flexibly held thereto in such a manner as to permit it to rise above the plane of its pathway to adapt itself to the various conditions of the work, to add to its efficiency, and to prevent breakage.

These features and the necessary devices employed to produce these results and their several combinations constitute the subject-matter of this application.

In the accompanying drawings, Figure 1 is a plan view of my improved combined rake and reel, mounted on a harvester-frame, of which Fig. 2 is a front elevation; Fig. 3, a like elevation, mainly, of a rake-head and its connections with the reaper. Fig. 4 is a detail plan view of the rake-heads and their connections, of which Fig. 5 is an elevation. Fig. 6 is an under-face view of a portion of the crown-wheel and rake-arm. Fig. 7 shows a modification of the rake-operating device. Fig. 8 is a detail vertical central section, showing the adjustable connection of the rake-arm with the shoulder-socket.

In the foregoing figures I have only shown such parts of a reaper as are necessary to represent my invention. Other parts required to produce a complete reaping-machine may be any of the known devices employed in any of the known forms for like purposes, and hence it is not deemed necessary to represent or describe them in this specification.

The main frame of a reaping-machine on which my improved combined rake and reel is mounted is composed of a cutter-bar, A, a platform-supporting beam, B, an end beam, C, and an angular end beam, D, suitably framed and fixed to each other. On this frame is supported the receiving-platform E, all of which are substantially the same as similar parts of some reaping-machines now found in the trade.

F represents a spider, of suitable form, to serve as a support for the rake-post, and is mounted on the driving-wheel end of the main frame in a suitable position to properly locate the rake. G is a rake-post, having its lower end firmly fixed in the spider, from which it rises perpendicularly.

H is a crown-wheel, having its center provided with a hub centrally bored to receive that portion of the rake-post immediately above the spider, to revolve thereon. The under face of the crown-wheel, at its outer edge, is formed with gear-teeth, which engage the teeth of the gear-pinions $a$, mounted on the shaft $b$, fitted to revolve in suitable bearings fixed to the main frame. The shaft $b$ is designed to be put in working connection with the moving parts of the reaper to impart a rotary motion to the crown-wheel. The upper face of the crown-wheel is fitted at proper intervals with uprising ears $c$, adapted to receive the inner ends of the rake and reel arms.

I are rake-heads, substantially such as are found in the trade, and are fitted with teeth $d$, to engage the grain and carry it from the platform. The inner ends of these rake-arms are fitted with joint shoulder-sockets $e$, which are pivoted to the ears $c$ of the crown-wheel in such a manner as to permit a free vertical movement of the rake-heads and hold them firm radially, that in the revolutions of the crown-wheel they will be made to sweep the platform.

The outer upper surface of the crown-wheel immediately under the rake-arms is fitted with a stop, $g$, to limit the downward movement of the rake-head, to hold it at a proper level to sweep the platform as a rake. The inner ends of the rake-arms are made vertically adjustable on the shoulder-sockets by means of the adjusting-screws $g'$, which are passed through the inner ends of the arms, with their points resting against the upper surface of the shoulder-sockets. These screws, in connection with the screws $g''$, which fix the shoulder-sockets to the arms, furnish the means for adjusting the rake-heads higher or lower, as represented at Fig. 8, to cause them to traverse the platform at a proper level to deliver the cut grain from the platform.

$h$ represents a lever-stop of button-form, pivoted to swing on the under side of the rake-arm, in such a manner that when the rake-head is raised it will swing inward between the rake-arm and the crown-wheel, as in dotted lines in Fig. 6, and as at $h$, Figs. 3 and 5, to hold the rake elevated to operate as a reel-bat.

$i$ represents a spring employed to operate upon the pivoted lever-stop, to insure its inward-swinging movement when the rake-head is elevated. A modification of this device is represented at Figs. 2 and 7, in which the pivoted lever-stop $h$ is pivoted to the side of the rake-arm to swing inward onto the crown-wheel by the action of the spring $i'$, to support the rake above the platform to operate as a reel-bat, and, when the stop $h'$ is moved into the position represented in dotted lines at Fig. 7, will permit the rake to descend to be supported on the crown-wheel in its raking position, as represented in dotted lines.

K represents a controlling-segment, having its inner surface curved to coincide with the outer edge of the crown-wheel, and from its under face depends a lever-arm, $k$, pivoted to the outer portion of an arm, $f$, which is an extension of the spider F.

$l$ represents a spring, which operates to hold the controlling-segment in its nearest position to the crown-wheel. $m$ is a rod hinged to the lower end of the lever-arm $k$ and to the lever $n$, which is pivoted to the main frame in such a manner as to be operated by an attendant to swing the controlling-segment from the crown-wheel, the outward movement of which is limited by an upward-projecting point on the outer end of the arm $f$. This controlling-segment is employed to put the rakes under the control of the attendant, and when in its closed position, as in Figs. 1, 2, 3, and 5, and as represented in the dotted lines at Fig. 6, the pivoted lever-stop will enter between the rake-arms and the crown-wheel and hold them in an elevated position to operate as a reel-bat; and when the controlling-segment is held in its outward position, as in solid lines at Figs. 2 and 6, the pivoted lever-stop will be carried over the outer edge of the crown-wheel by means of the depending arms of the stops coming in contact with the controlling-segment when in its farthest position from the crown-wheel, and will permit the rake-heads to descend to their lowest position, to operate as a rake, to traverse the platform in a plane substantially parallel thereto to sweep the cut grain therefrom and deliver it in gavels.

L and L' represent a cam, composed of two parts, circular in plan, and is mounted on the vertical reel-post a proper distance above the crown-wheel, with its working-surface inclined to the axis of the post, dipping toward the platform centrally between the cutter-bar and the delivery edge. The lower portion, L, of the cam is recessed in the center of its upper surface, leaving a working rim-surface on its outer edge, and its recessed surface admits the sleeve $o$ to revolve on the post between the two portions of the cam. The sleeve $o$ is fitted with trunnions projecting from its opposite sides, which receive the yoke-like inner ends of the jointed connecting-rods M in such a manner as to permit them to ascend and descend the inclined working-surfaces of the cams. The two portions L and L' of the cam are separated sufficiently to freely permit the jointed connecting-rods to pass between them in their revolutions round the rake-post, but in such a manner as to be guided in the track of their movements by the groove formed by the working-surfaces of the two portions. The outer portion of the connecting-rod is of yoke-form, composed of arms $s$ and $s'$, having its center hinged to the outer end of one of the inner portions, and its depending arms passing, one on each side of the rake-arm, through eyes $t$, which project therefrom in such a manner as to permit them to slide through the eyes when the rake-head is carried in an elevated position over the platform, as represented in Fig. 3, to operate as a reel-bat.

The lower ends of the depending arms $s$ and $s'$ are made in hook form, to engage the projecting eyes to elevate the rake when the jointed arm is ascending the rear portion of the cam, to carry it in a nearly vertical position past the driver and team, and to permit it to descend to the proper level on approaching the cutter-bar to operate again either as a rake or reel-bat.

The rear arm, $s$, of the outer portion of the connecting-rod is provided with a spring, $u$, operating to hold the hook end of the arm in contact with the eye. This action serves to hold the rake to the platform, and also in its elevated position, in a flexible manner, to permit it to adapt itself to the various conditions of the work; and the spring action on the rearward side of the rake to some extent serves to counteract the twisting force exerted on the rake in gathering the grain to the cutters and sweeping the cut grain from the platform.

At $s''$ I have represented the outer portion of the jointed connecting-rod formed of one arm, having its depending hook end passed through an eye, $t'$, which is fixed to the rake head or arm, and extends rearward thereof, and the hook-arm is fitted with a spring, $u'$, as in the yoke-arm hereinbefore described. This modification may be employed instead of the yoke-formed outer portion of the jointed connecting-rod, and its operation will be substantially the same, except that the yoke form produces a better balanced action.

N represents reel-arms, which are substantially the same as reel-arms now in common use in this class of reels, and their inner ends are pivoted to the crown-wheel between ears $c'$, in the usual manner, to permit a free vertical movement. These reel-arms are supported and guided in the path of their movement by links $p$, which connect with an overhanging center, $r$, which is the outer portion of an arm, P, projecting from the upper surface of the upper portion, L, of the cam, and inclines toward the platform in a line substantially parallel with the cutter-bar. This connection of the reel-arms with the centers on which they revolve cause them to traverse a pathway which is found to be favorable to gather the grain to the cutters, deposit it on the platform as it is cut, and pass the driver and the team in a nearly vertical position without interference.

By this construction I am enabled to produce a reliable combined rake and reel of few parts at a small cost, and in which the rakes are capable of use either as a rake or as a reel-bat once in each revolution, governed and controlled at the will of the attendant, to operate in either capacity, as circumstances may require, and in either capacity will be held in its lowest position in a flexible manner by spring action in traversing the platform.

I claim as my invention—

1. The combination, with a harvester-reel, of a rake constructed and adapted for use either as a rake or as a reel-bat, of a jointed connecting-rod, one portion of which is located in a trackway, and another portion attached to the rake-head, and a spring connected with said connecting-rod, and serving to hold the rake-head in its lowest position, and allow the rake-head to rise vertically in opposition to the tension of the spring at any point in its travel, substantially as set forth.

2. The combination, with a rake-head capable of use either as a rake or as a reel-bat, of a jointed connecting-rod, the outer portion of which is of yoke form, its depending hooking ends passing through eyes projecting forward and rearward of the rake-arm, substantially as and for the purpose hereinbefore set forth.

3. The combination, with a rake-head capable of use either as a rake or as a reel-bat, guided in the path of its movement by a jointed connecting-rod, and a spring applied to said jointed connecting-rod to hold the rake flexibly in its lowest position, of a stop interposed between the crown-wheel and rake-arm to limit its descent as a rake, substantially as hereinbefore set forth.

4. The combination, with a rake-head capable of use either as a rake or as a reel-bat, guided in the path of its movement by a jointed connecting-rod, and a spring applied to said jointed connecting-rod and adapted to hold the rake flexibly in its lowest positions, of a pivoted lever-stop to enter between the crown-wheel and rake-arm to hold the rake-head elevated to operate as a reel-bat, substantially as hereinbefore set forth.

DANIEL L. EMERSON.

Witnesses:
A. O. BEHEL,
JACOB BEHEL.